United States Patent [19]

Novinson

[11] Patent Number: 4,661,160

[45] Date of Patent: Apr. 28, 1987

[54] ALKALINE EARTH METABORATES AS PROPERTY ENHANCING AGENTS FOR REFRACTORY CONCRETE

[75] Inventor: Thomas Novinson, Ventura, Calif.

[73] Assignee: The United States of America as represented by the Secretary of the Navy, Washington, D.C.

[21] Appl. No.: 852,469

[22] Filed: Apr. 11, 1986

[51] Int. Cl.$^4$ ............................................. C04B 7/32
[52] U.S. Cl. .................................... 106/104; 501/124
[58] Field of Search ......................... 106/104; 501/124

[56] References Cited

U.S. PATENT DOCUMENTS 3,645,750 2/1972 Sadran .................................. 106/104
3,662,830 5/1972 Martin ................................. 106/104

FOREIGN PATENT DOCUMENTS 2408412 10/1974 Fed. Rep. of Germany ...... 106/104
1539839 9/1968 France ................................. 106/104

Primary Examiner—Ferris H. Lander
Assistant Examiner—Steven Capella
Attorney, Agent, or Firm—Louis Allahut; Joseph M. St. Amand

[57] ABSTRACT

A significant increase in the structural strength of heated calcium aluminate refractory products, such as mortar and concrete, can be obtained by the addition of alkaline earth borates, barium metaborate in particular, and heating in the range of 500 to 1000 degrees F. to cure the refractory, with an optimum strength provided at approximately 750 degrees F.

12 Claims, 1 Drawing Figure

Crushing Strengths of Heat Cured Alumina Refractories Modified with Metal Borates

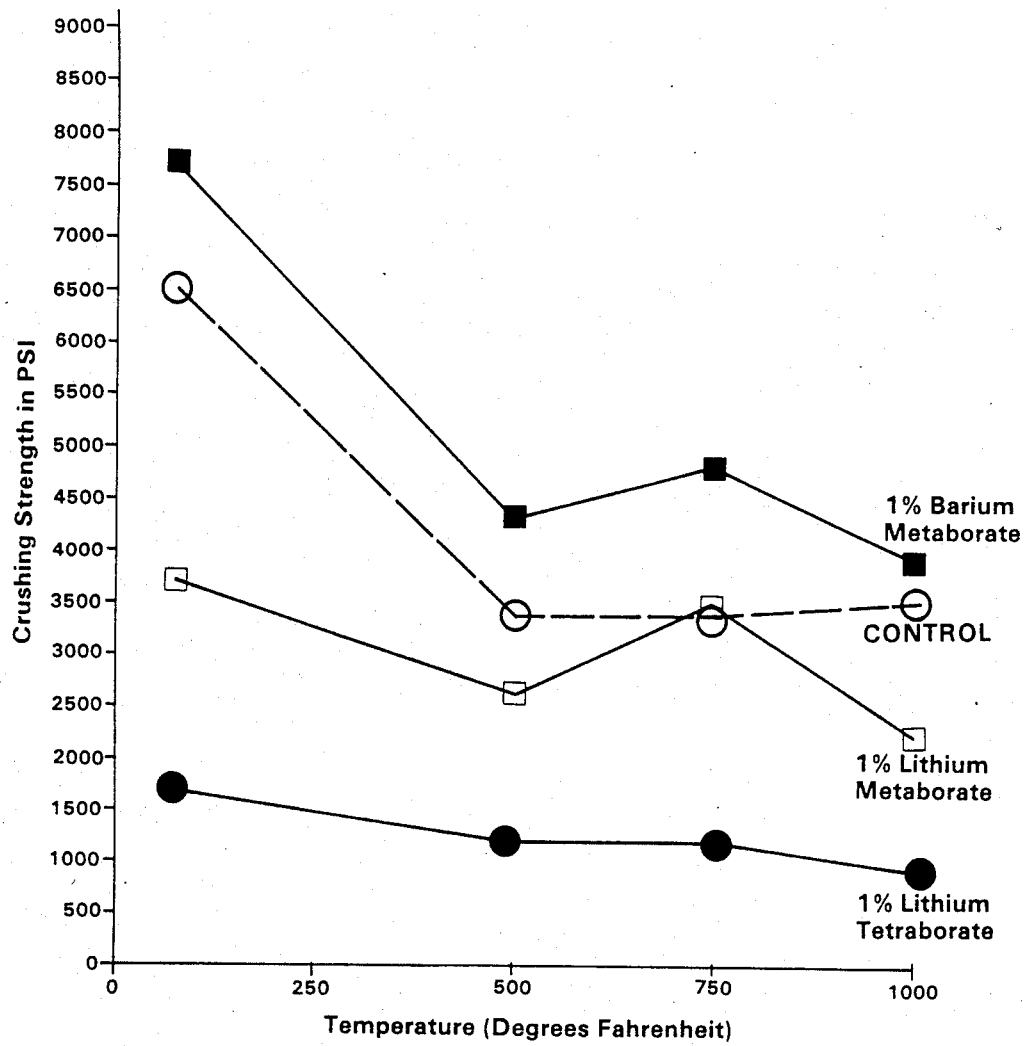

ALKALINE EARTH METABORATES AS PROPERTY ENHANCING AGENTS FOR REFRACTORY CONCRETE

BACKGROUND OF THE INVENTION

The present invention relates to refractory concretes and particularly to lowering the fusion point of high alumina refractory concretes and mortar while increasing their structural strength. Reduction in cure temperature is beneficial in conserving energy and reducing construction costs.

BACKGROUND OF THE INVENTION

Refractory concretes are made by mixing water with a dry mixture of cement and aggregate. The cement consists of 10 to 50 percent calcium oxide (lime) and 50 to 80 percent alumina (bauxite, aluminum oxide) plus other, non-reactive minerals such as clays, titanium oxide or magnesium oxide. The aggregates are generally "tabular" alumina or chrome ore (complex iron, calcium or aluminum chromites) which may be used as a fine powder (−200 mesh, i.e. 0.001 inch) to a coarse (0.75 inch) grade. The amount of water used is generally 10 to 15 percent by weight of the total solids.

The refractory mortar (fine aggregate) or refractory concrete (coarse aggregate) may be trowelled, placed, cast or gunned (mortar only), as with conventional portland cement concretes or mortars. The differences between the two types of products are that (a) portland cement products achieve strength by continuous hydration, whereas (b) refractory products are baked slowly to 2000 degrees F. or higher to achieve a ceramic-like bond.

Refractories normally have a depression or well in the range of 500 to 1000 degrees F. of a strength vs. temperature curve, as shown in the FIGURE of drawing. This loss of strength is due to changes in mineral composition as the material progresses from an hydraulic to a non-hydraulic concrete or mortar. For some purposes, this loss of strength is not critical if the refractory is to be used in the 2000 degrees F. to 3000 degrees F. range. However, the strength loss is critical when the "in use" or working temperature range is 500 degrees F. to 1000 degrees F., as in the case of linings for jet engine test cells, chimney stacks in power plants, and incinerators.

Therefore, it would be more desirable to have a refractory mortar that could be heat cured a much lower temperatures, but would retain the strength of a refractory product heat cured at 2000 to 3000 degrees Fahrenheit.

SUMMARY OF THE INVENTION

It is an object of this invention, therefore, to lower the fusion point of alumina refractory concretes while increasing the strength thereof.

It has been found that small amounts of some alkaline earth salts, certain alkaline earth borates in particular, can be used to lower the fusion point and increase the strength of high aluminate refractories.

This invention due, to lowering of the fusion point in refractory concretes, provides substantial reductions in cost because high heat and large amounts of fuel are not required for heat curing. The improved refractory mortars provided, have significant increase in strength and can be cured at a range of 500 to 1000 degrees F.; a maximum strength is provided at appproximately 750 degrees F.

BRIEF DESCRIPTION OF THE DRAWING

The FIGURE of drawing is a curve chart showing the comparative crushing strength of refractory concretes modified by metal metaborates and tetraborates compared to an unmodified calcium aluminate refractory concrete.

DESCRIPTION OF THE PREFERRED EMBODIMENTS

Certain alkaline earth salts, particularly the barium, strontium, calcium and magnesium metaborates, have been found to remarkably increase the strength of high alumina refractory mortars. The curves shown in the FIGURE of drawing illustrate the strength of heated refractory concretes with 1 percent barium metaborate compared to those with 1 percent lithium metaborate, 1 percent lithium tetraborate, and with unmodified calcium aluminate mortar used as a control.

Although the barium and lithium metaborates both cause strength increases around 750 degrees F. (seen as a hill or peak), the refractory concrete using barium metaborate exhibits a much greater strength increase overall, whereas the lithium salt actually decreases the overall strength of the alumina refractory.

An admixture of 0.5 to 5 percent (preferably 1 percent) by weight of barium metaborate, strontium metaborate, calcium metaborate, or magnesium metaborate, when added to a calcium aluminate refractory mortar mix and mixed together with 10 to 15 percent by weight of water, provided a wet mortar mix which when, cast and heat cured, showed a remarkable increase in strength.

The wet mix is cast to form a desired structure. When applied over conventional portland cement concrete structures and heat cured, the improved mortar mixture provides protection to portland cement concrete which otherwise begins to deteriorate at around 500 degrees F.

The improvement in refractory concretes given by the present invention provides at least a 1000 psi increase in strength in concrete structures for the temperature range of 500 to 1000 degrees F. Barium, strontium, calcium and magnesium metaborates, listed in the order of highest strengthening enhancement, when added to refractory cement concrete, all provided better than average increases in strength above the control curve for unmodified calcium aluminate mortar, shown in the curves of the drawing. Their crushing strengths at approximately 750 degrees F. ranged from around 4000 to 4800 psi.

Lithium, sodium, potassium, cesium and rubidium (alkali) metaborates were also compared, but showed from no effect to a decrease in strength effect on refractory mortar mixes.

It appears that the divalent alkaline earth salts, e.g. barium metaborate, strontium metaborate, calcium metaborate, and magnesium metaborate, substitute for calcium in the calcium aluminate refractory mortar mixes and somehow cause an increase in strength at elevated temperatures in the range of from 500 to 1000 degrees F. With these admixtures it is not necessary to cure refractory concretes at temperatures of 2000 degrees F. and greater, thereby avoiding damage to portland cement concrete type structures to which they can be applied for protection.

It was also found that zinc metaborate, which also is a divalent metal salt, performed similar to the divalent alkaline earth metaborates (barium, strontium, calcium magnesium) and has a comparative crushing strength curve just below that for barium metaborate shown in the drawing and above that of strontium metaborate. Radium metaborate was not considered because radium compounds are radioactive, and beryllium metaborate was not considered because its water soluble derivatives are highly toxic.

The metaborates of lithium, sodium, potassium, cesium, and rubidium, all monovalent cations, provided either a decrease in strength or substantially no effect on the refractory cement mortar mixes at the desired 500 to 1000 degree F. range, when used as discussed above.

The alkaline metaborates, as disclosed, can be used with any calcium aluminate refractory concrete or mortar mix using calcium aluminate cement, and containing either tabular alumina or chrome ore aggregates.

Barium and lithium metaborates are commercially available. The other metaborates, i.e. calcium, magnesium and strontium metaborate, can be made, for example, by reacting equimolar quantities of the metal nitrates of calcium, magnesium or strontium with sodium metaborate in water at 40 degrees C. for 6 hours. After stirring for 6 hours, the solution is chilled to 10 degrees C., and the less soluble strontium, calcium or magensium metaborate is filtered using conventional filtration methods.

Obviously many modifications and variations of the present invention are possible in the light of the above teachings. It is therefore to be understood that within the scope of the appended claims, the invention may be practiced otherwise than as specifically described.

What is claimed is:

1. An improved cementitious composition for refractory concrete, comprising:

a mixture of approximately 0.5 to 5.0 percent by weight of the total weight of dry ingredients of dry alkaline earth metaborate with a dry calcium aluminate refractory concrete mix, admixed with from 10 to 15 percent by weight of water to provide a refractory composition;

said refractory composition when cured at a range of 500 to 1000 degrees Fahrenheit having at least 1000 psi increased strength over that of the same calcium aluminate concrete without the added alkaline earth metaborate.

2. A refractory concrete composition as in claim 1 wherein said alkaline earth metaborate is barium metaborate.

3. A refractory concrete composition as in claim 1 wherein said alkaline earth metaborate is strontium metaborate.

4. A refractory concrete composition as in claim 1 wherein said alkaline earth metaborate is calcium metaborate.

5. A refractory concrete composition as in claim 1 wherein the optimum curing temperature is approximately 750 degrees Fahrenheit.

6. The method for lowering the fusion point of high alumina refractory concretes and mortars while increasing the structural strength thereof, comprising:

admixing from 0.5 to 5.0 percent by weight of the dry ingredients of dry zinc metaborate with a dry calcium aluminate refractory concrete/mortar mix;

mixing the dry ingredients with approximately 10 to 15 percent by weight of water; and curing the resultant mixture at a range of approximately 500 to 1000 degrees Fahrenheit.

7. The method as in claim 6 wherein said alkaline earth metaborate is barium metaborate.

8. The method as in claim 6 wherein said alkaline earth metaborate is strontium metaborate.

9. The method as in claim 6 wherein said alkaline earth metaborate is calcium metaborate.

10. The method as in claim 6 wherein the optimum curing temperature is approximately 750 degrees Fahrenheit.

11. An improved cementitious composition for refractory concrete, comprising:

a mixture of approximately 0.5 to 5.0 percent by weight of the total weight of dry ingredients of dry zinc metaborate to a dry calcium aluminate refractory concrete mix, admixed with from 10 to 15 percent by weight of water to provide a refractory composition;

said refractory composition when cured at a range of 500 to 1000 degrees Fahrenheit having at least 1000 psi increased strength over that of the same calcium aluminate concrete without the added zinc metaborate.

12. The method for lowering the fusion point of high alumina refractory concretes and mortars while increasing the structural strength thereof, comprising:

admixing from 0.5 to 5.0 percent by weight of zinc metaborate with a calcium aluminate refractory concrete/mortar mix;

mixing the dry ingredients with approximately 10 to 15 percent by weight of water; and curing the resultant mixture at a range of approximately 500 to 1000 degrees Fahrenheit.

* * * * *